(12) United States Patent
Subbarayan et al.

(10) Patent No.: US 7,699,563 B2
(45) Date of Patent: *Apr. 20, 2010

(54) LANDFILL AND METHOD OF DECOMPOSING REFUSE IN A LANDFILL

(75) Inventors: Murugappan Subbarayan, Troy, MI (US); John Lawrence O'Keefe, Lexington, MI (US); Te-Yang Soong, Novi, MI (US); Jan M. O'Keefe, Lexington, MI (US)

(73) Assignee: Virdis Waste Control, LLC, Dublin, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/079,207

(22) Filed: Mar. 25, 2008

(65) Prior Publication Data

US 2008/0181726 A1 Jul. 31, 2008

Related U.S. Application Data

(63) Continuation of application No. 11/096,170, filed on Mar. 31, 2005, now Pat. No. 7,347,648.

(51) Int. Cl.
*B09B 1/00* (2006.01)
(52) U.S. Cl. .................................. 405/129.95
(58) Field of Classification Search ............ 405/129.95, 405/129.2, 129.1, 128.85
See application file for complete search history.

(56) References Cited

U.S. PATENT DOCUMENTS

| | | | |
|---|---|---|---|
| 5,201,609 A | 4/1993 | Johnson | |
| 5,857,807 A | 1/1999 | Longo, Sr. | |
| 6,283,676 B1 | 9/2001 | Hater et al. | |
| 6,364,572 B1 | 4/2002 | Hudgins et al. | |
| 7,347,648 B2 * | 3/2008 | Subbarayan et al. | ... 405/129.95 |
| 2003/0201226 A1 | 10/2003 | Kelly | |

OTHER PUBLICATIONS

Zhao, et al. "Enhanced waste decomposition in bioreactor landfill with septage additions"., Geofrontiers Jan. 2005.*
Zhao, et al., Enhanced Waste Decomposition in Bioreactor Landfill with Septage Additions, Geosynthetics Research and Development in Progress, Jan. 2005.
Association of State and Territorial Solid Waste Management Officials—Special Waste Talk Force—Septage, extracted from ASTSWMO database on Feb. 15, 2005, 3 pages.
Operating Plan for the Landfill Bioreactor Project at the New River Regional Landfill, Bioreactor Landfill Operations Plan, Mar. 23, 1999, 10 pages.
Walsh et al., Preparing Landfill Designs & Specifications, Waste Age, Jul. 2002, 6 pages.
Septage Receiving System, JWC Environmental, 2001, 2 pages.
Closure Plan Richmond Landfill—Prepared for Ecowaste Industries Ltd. by GNH Engineering, May 1999, 24 pages.
Checklist for Administrative Completeness Solid Waste Landfill Construction Permit Packet, Michigan Department of Environmental Quality, Waste and Hazardous Materials Division, Feb. 2003, 15 pages.

(Continued)

*Primary Examiner*—John Kreck

(57) ABSTRACT

Landfills and their methods of operation are disclosed. Through the controlled introduction of septage into a wet cell having a refuse layer, refuse decomposes faster to achieve additional landfill space.

19 Claims, 4 Drawing Sheets

OTHER PUBLICATIONS

Design of Septic Tanks, extracted from cet.nau.edu database, Feb. 11, 2005, 5 pages.

Anoka Regional Sanitary Landfill: Update on Summary Construction, Minnesota Pollution Control Agency, Jul. 5, 1999, 3 pages.

Biosolids Glossary of Terms, University of Missouri Extension, Apr. 1995, 6 pages.

Chapter 4, Local Responsibilities, 4 pages.

Survey of Septage Treatment, Handling and Disposal Practices in California, California Wastewater Training and Research Center California State University, Chico, Dec. 17, 2002, 26 pages.

Water Quality—Biosolids Program Summary, extracted from deq.state.or.us database Feb. 15, 2005, 5 pages.

Florida Bioreactor Demonstration Project—What is a Bioreactor Landfill, extracted from bioreactor database, Feb. 14, 2005, 3 pages.

The Ohio State University Bulletin—Septage Management in Ohio—Bulletin 854, extracted from ohioline.osu database, Feb. 14, 2005, 2 pages.

Patterson et al., Re-Use Potential from Septage Receival and Treatment Facilities Amidale, The Australian—Indonesian International Conference, Oct. 1998, 10 pages.

He et al., Biological Degradation of MSW in A Methanogenic Reactor Using Treated Leachate Recirculation, Process Biochemistry 40, 2005, pp. 3660-3666.

Valencia et al., Alternative Treatment For Septic Tank Sludge: Co-Digestion With Municipal Solid Waste In Bioreactor Landfill Simulators, Journal of Environmental Management, xxx, 2008, 6 pages.

Elango et al., Production of Biogas from Municipal Solid Waste With Domestic Sewage, 2006, 4 pages.

Characterization, Design, Construction, And Monitoring of Bioreactor Landfills, Technical Regulatory Guideline—Prepared by The Interstate Technology & Regulatory Council Alternative Landfill Technologies Team, Feb. 2006.

Lesson 7: Preparing Landfill Designs & Specifications, Waste Age.com, Jul. 1, 2002, 11 pages.

Honey Monster Septage Receiving System, extracted from JWC Environmental, 2003, 1 page.

Biosolids vs. Septage: What's the difference?, Land Applications Draft Regulations: Weld Country, Colorado—Land Applcations, 2002, 2 pages.

* cited by examiner

LANDFILL AND METHOD OF DECOMPOSING REFUSE IN A LANDFILL

CROSS-REFERENCE TO RELATED APPLICATIONS

The subject patent application is a continuation of U.S. patent application Ser. No. 11/096,170, which was filed on Mar. 31, 2005 and issued as U.S. Pat. No. 7,347,648 on Mar. 25, 2008.

TECHNICAL FIELD

The present invention provides a method of reducing the volume of waste in a landfill to increase capacity and landfill gas generation, provide a beneficial use for septage waste and a business method for operating a landfill to achieve greater profitability.

BACKGROUND OF THE INVENTION

Landfill design, construction, and operation are some of the most highly regulated activities in the United States. These activities involve federal, state and local regulations, all of which deal with the environmental impact of the landfill and its operation. Even the closure of a landfill is subject to strict regulations. Numerous permits must be obtained at virtually all levels of government. These regulations include provisions relating to groundwater quality protection; landfill gas control; air pollution; surface water discharge; flood plains; safety issues; settlement, slope stability; and basic operating procedures. Boundary and topographic surveys, hydrogeological information (e.g., geological formation, soil texture, structure, bulk density, porosity, permeability, moisture, ion exchange characteristics; depth and type of bedrock; groundwater depth, hydraulic gradients, and seasonal fluctuations); climatological data such as wind direction and temperature and other variables must be evaluated, measured and documented during design, construction and operation of a landfill.

Typically, landfills are constructed in phases or "cells" that are distinct hydraulic units. In landfill operations, the cell presently receiving waste is called the "working face" or "active area" of the landfill. As refuse is received at the working face it is dumped, spread and compacted in layers called "lifts". Active areas are typically 200 ft×200 ft in size where a refuse compactor and/or a bulldozer are used to spread and compact refuse in lifts as it is dumped. The cell continues to be filled in lifts until it reaches capacity, at which time it is covered or capped. All landfills must have cohesive soil and/or synthetic liners at the bottom and along the sideslopes to isolate the refuse and contaminated liquid (or "leachate") from the surrounding soil. Landfill cells can be classified as either "wet cell" or "dry cell" depending on how leachate is managed in the cell.

Moisture, such as rainfall, that enters landfill cells percolates through the refuse and produces leachate which accumulates at the lowest point of the cell bottom. This leachate is typically pumped and disposed of at a wastewater treatment plant or an in-house treatment system. In a dry cell, capping the landfill quickly with cohesive soil and/or synthetic barrier eliminates infiltration and ensures a relatively dry environment. The intent of operating dry cells is to minimize the amount of moisture entering the refuse mass and the subsequent amount of leachate formed.

Although wet cell landfills are known (as will be discussed more fully hereinafter), dry cells are more common. In dry cell landfills the deposited refuse dries and decomposes at extremely slow rates because moisture, an essential component of the decomposition process, is restricted. These dry cells are sometimes referred to as "Dry Tombs," since it is not unusual for them to contain waste materials that have decomposed little after fifty years or more. Without decomposition, the landfill cells fill more rapidly and must be closed before their potential capacity is reached.

Conventional wet cells are those in which leachate generated in the landfill is collected and reintroduced into a cell, wherein the leachate is absorbed by and continues to percolate through the waste. This so-called "leachate recirculation" operation promotes biological decomposition of refuse. This approach differs greatly from the approach of dry cell management of solid waste landfills where, as stated, biological decomposition of waste is intentionally inhibited, by restricting the moisture content of the cell. In wet cell landfills, there is no need to prevent moisture from entering the cell. As the waste decomposes, it further compacts or consolidates, hence allowing additional refuse to be deposited into the cell. When these we cells are properly engineered and operated in a manner that maximizes decomposition and gas generation, they are sometime referred to as "landfill bioreactors" or "bioreactor landfills".

Accordingly, it is evident that using landfill space efficiently and extending the site life to the extent possible, as well as recouping capital expenditure and operating the landfill profitably, are all desirable goals.

It is also known that septic systems separate the liquid of domestic sewage from solid and semi-solid materials by allowing these undissolved components to either settle to the bottom of a septic tank or float to the top while the liquid flows through a series of pipes that run to the soil absorption filed (a.k.a. the "septic field"). Thus, septic tanks collect settled and floatable solids from the wastewater. The septic field then filters and treats the partially clarified septic tank liquid and distributes it through the soil. The septic tank also promotes biological breakdown of a portion of the solids.

Periodically, depending upon a number of factors such as tank size and frequency of use, the contents of the septic tank (septage) must be removed from the septic tank. This is achieved by pumping the septage from the septic tank into a truck which hauls the pumped septage away from the site. Many septage haulers are small, independent companies. They typically dispose of the septage either at waste water treatment facilities or at sites permitted for land application. Wastewater treatment plants usually charge the haulers significant fees for disposal. Meanwhile, land application is inexpensive but the practice poses certain public health risks and increased regulation. It would be desirable to provide an alternative, environmentally safe and cost effective disposal for septage which could reduce the hauler's disposal fees and public health concerns.

SUMMARY OF THE INVENTION

In one aspect, the present invention provides a method of accelerating the decomposition of waste in a waste disposal facility such as a landfill and provides a new use for septage. In the method, septage from septic tanks is added to a landfill cell in a controlled manner to provide moisture, pH-control, organic content and a host of microbes that foster biological decomposition of waste. Preferably, the septage is domestic grade septage such as that collected from septic tanks at residential households, schools, restaurants, motels and the like in non-urban communities. In another aspect, as leachate is formed by the percolation of liquid through the refuse it is recirculated back into the cell through the septage distribution system provided in the present invention. These wet cells act as bioreactors, with enhanced biological decomposition of landfill waste provided by the addition of the septage. By increasing the rate of decomposition, additional space is created in the cell. This additional space can then receive more waste, prolonging the life of the cell and thus of the entire landfill. Moreover, by accelerating waste decomposition in accordance with the teachings of the present invention, the waste becomes stabilized, thus serving to help in protecting groundwater, land and the atmosphere from contamination and/or pollution.

In the broadest aspect, the present invention provides a landfill containing refuse. The novel landfill includes at least one wet cell having at least one refuse layer. The wet cell has one or more septage distribution systems above the refuse layer with the septage distribution system defining spaces. A quantity of septage temporarily occupies the defined spaces with the defined spaces being located about the refuse layer to provide for controlled addition of septage to the refuse layer.

The subject invention also includes a method of decomposing refuse in the landfill having at least one wet cell. The method comprises the steps of placing a layer of refuse at a bottom of the wet cell to define a refuse layer; placing a septage distribution system in association with the refuse layer; and adding septage to the refuse layer through the septage distribution system.

This Summary of the Invention is not to be construed or interpreted as limiting the full scope of the invention as embodied in the patent claims.

DETAILED DESCRIPTION OF PREFERRED EMBODIMENTS OF THE INVENTION

Figure 1:
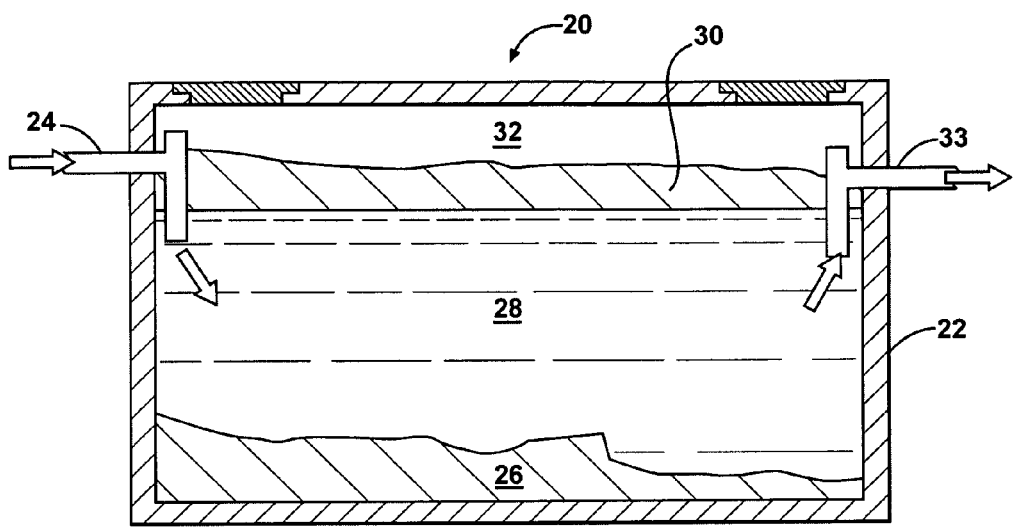
FIG. 1 is a diagrammatic cross-section of a septic tank.

Referring now to FIG. 1 of the drawings, septic tank 20 is shown having a tank body 22 and inlet 24 for receiving waste, preferably domestic sewage. As the content of sewage settles, it forms a solid/semi-solid fraction 26, a liquid effluent 28, and a floatable layer fraction (or "scum") 30. A gas space 32 is also provided. As fraction 26 and fraction 30 separate, outlet 33 allows liquid effluent 28 to flow to a soil absorption field. When septic tank 20 is cleaned, fraction 26, effluent 28 and scum 30 are pumped into a tanker truck (not shown). The combined materials of fraction 26, effluent 28, and scum 30 constitute septage. As used in the present invention, it is preferred that the septage (septage haulers usually have a mixture of septage from multiple septic tanks) has a pH that is desirable for biological decomposition of waste, but pH adjustment through the addition of acids or bases may also be necessary. Importantly, the septage is biologically active. In other words, it contains numerous microorganisms which, in the present invention, serve to decompose solid waste in wet cells of a landfill.

Figure 2:
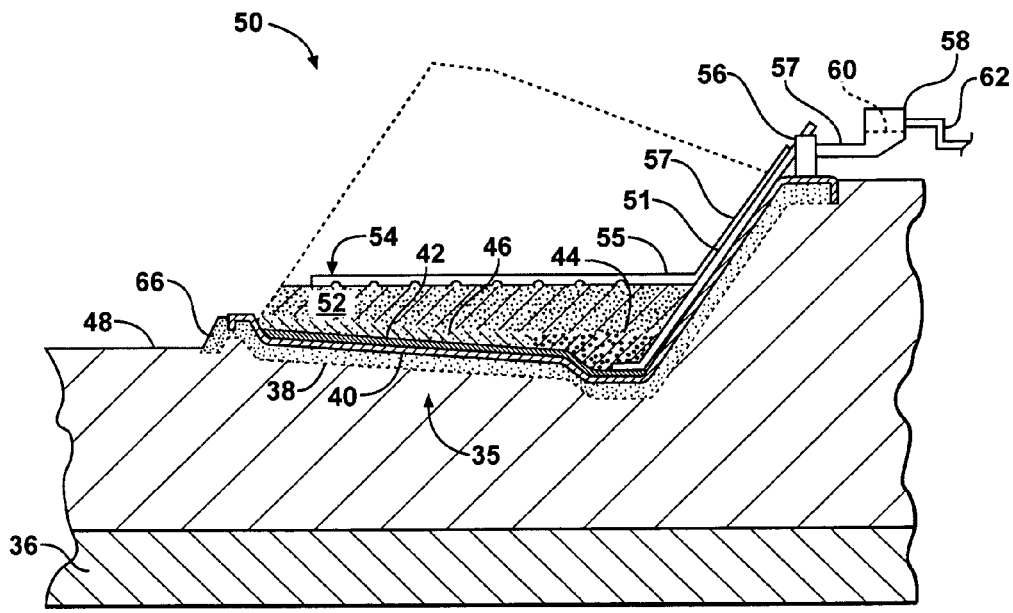
FIG. 2 is a diagrammatic elevation cross-section of a landfill wet cell made in accordance with the present invention.
Figure 5:
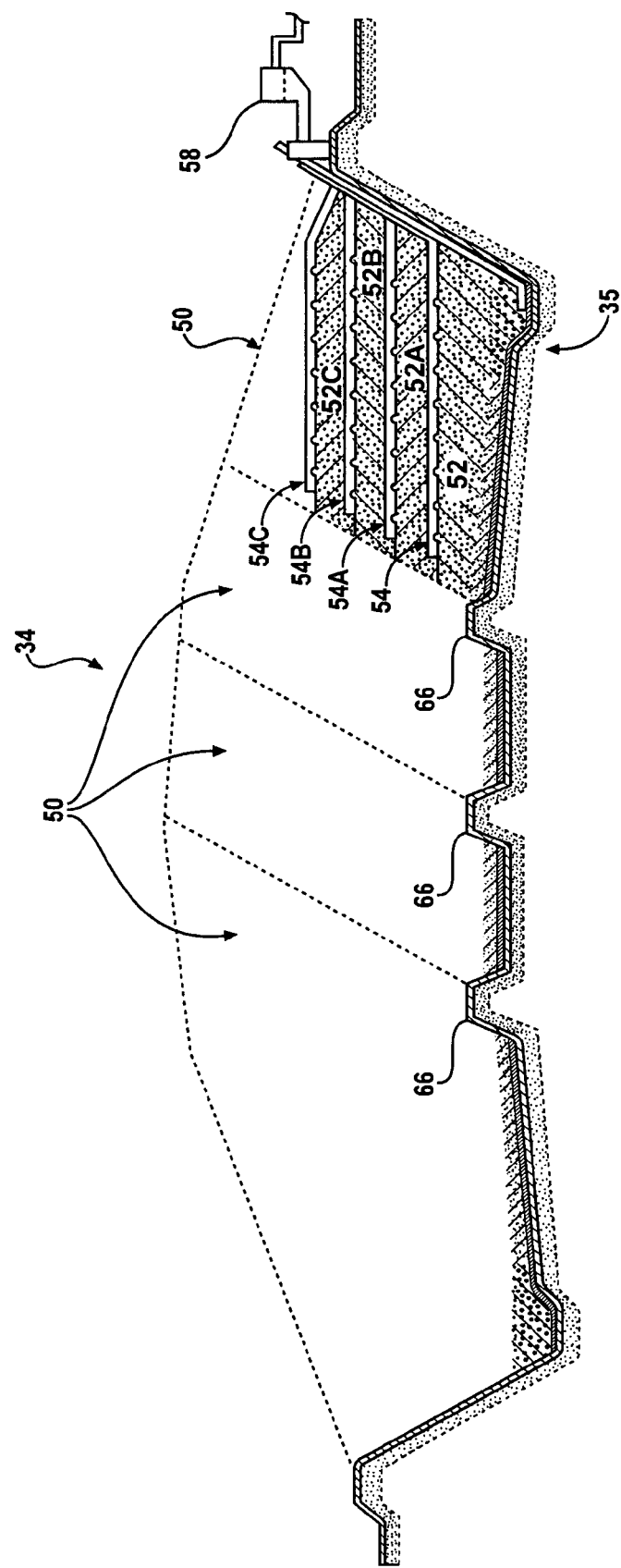
FIG. 5 is a diagrammatic elevation cross-section of a multi-cell landfill made in accordance with the present invention.

Referring next to FIGS. 2 and 5 of the drawings, a wet cell 50 of a solid waste landfill 34 is shown diagrammatically in cross-section. Wet cell 50 has a floor 35 and layered structures constructed above an aquifer or groundwater table 36, including compacted clay layer 38, synthetic liner (or "geomembrane") 40, an optional geotextile cushion layer 42 (which may be purchased from a number of suppliers), gravel layer 44 and drainage layer 46. The floor 35 includes thickness, material type/grade, and other technical specification of these materials will be dictated in part by federal, state and municipal regulations. Solely for exemplary purposes the clay layer 38 may be from about 24 inches to about 36 inches thick of cohesive soil constructed in 6-inch compacted lifts and properly tested during construction. Synthetic liner 40 may be from about 1.5 millimeters to about 2.0 millimeters in thickness and composed of, for example, high-density polyethylene (HDPE), Polyvinyl Chloride (PVC) or other flexible polyolefin liners such as Flexible Polypropylene (FPP) and Very Flexible Polyethylene (VFPP). Gravel layer 44 can be, for example, aggregates with 2-inch typical particle size and fine particles preferably not exceeding about five percent by weight. Drainage layer 46 includes sand or other porous material. Earth or ground 48 is also part of the cell or wet cell 50. As illustrated, the earth or ground 48 is disposed between the floor 35 and the aquifer 36. It is to be understood that the aforementioned materials and even the layer structure (e.g., a multi layered liner system for leak detection) per se can vary widely in practicing the present invention. Those skilled in the art will understand that liquid which percolates through a refuse layer 52 is collected in the drainage layer 46 and, by virtue of the grade, flows to the gravel layer 44 which serves as a sump. This liquid is known as leachate and can be collected through a leachate collection system through the use of a sump-pump (not shown) and added back into the refuse layer 52 through a liquid or seepage distribution system 54. The leachate collection system can include a leachate collection pipe 51.

Figure 3:
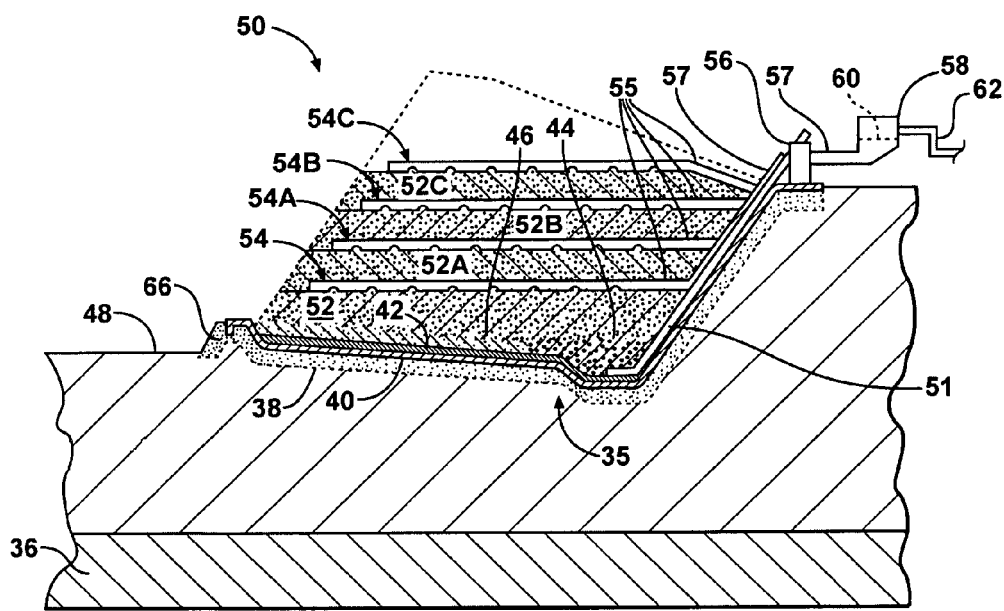
FIG. 3 is a diagrammatic elevation cross-section of a landfill wet cell made in accordance with the present invention at later stage of development.

Referring now specifically to wet cell 50 in FIGS. 2 and 3, the refuse layer 52 is shown, having been compacted in a conventional manner. Typically the refuse layer 52 will include conventional municipal solid waste, which can be from garbage trucks and the like. In order to evenly distribute the septage throughout the refuse layer 52, and thus provide as much biological decomposition as possible, the liquid or septage distribution system 54, in this embodiment shown as a network of distribution pipes 55, is provided on top of the refuse layer 52. The inventors of the present invention have invented three separate configurations of septage distribution system 54 which are not deemed to be equivalents of one another. The first of these is described next and is known as the network of distribution pipes 55.

Figure 4:
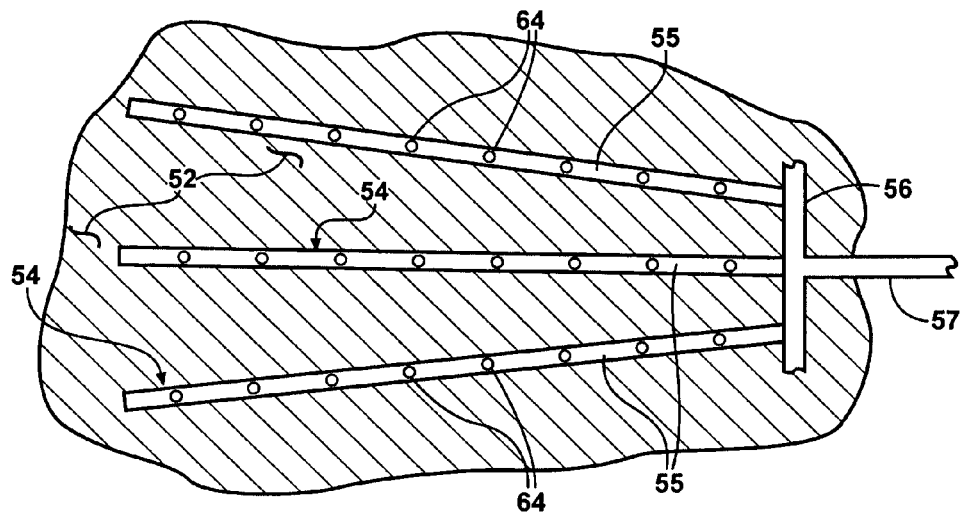
FIG. 4 is a partial view of one example of the septage distribution system as viewed from an underlying refuse layer.

Septage distribution pipes 55, which are preferably plastic pipes 55, have an inner diameter of from about 2 inches to about 4 inches and may be made of any number of materials, but most preferred is high density polyethylene due to its somewhat flexible nature, superb chemical and biological resistance, and ease of heat welding to produce the desired layout. Other materials such as PVC pipe or drainage pipes that are made of other materials are possible alternatives to HDPE. As best shown in FIG. 4, the pipes 55 are connected to a septage distribution manifold 56 which in turn, in this embodiment, is attached to a gravity-fed septage delivery conduit 57. While gravity feed of the septage is energy efficient, pumps can be used to transmit the septage more effectively and must be used as the layers of refuse 52 rise above ground level (best shown in FIG. 3). In some instances it may be possible to power these pumps and the sump pump with energy derived from landfill gases. The conduit 57 can be formed of any of the materials described above for distribution pipes 55. Delivery conduit 57 is attached to a septage receiving hopper 58 having a screen 60. Screen 60 serves to filter out relatively large solid objects which sometimes appear in septage such as plastic tampon containers and the like. Hose 62 delivers septage from a septage hauler (not shown) to the hopper 58. As septage is deposited in the hopper 58, the septage moves through the delivery conduit 57 and fills the pipes 55. In FIG. 3 of the drawings (in which like parts have the same reference numbers), cell 50 is shown with four septage distribution systems 54, 54A, 54B and 54C overlying one another and four refuse layers overlying one another, 52, 52A, 52B, and 52C. Septage distribution systems 54, 54A, 54B and 54C may all be connected to the manifold 56.

Figure 2A:
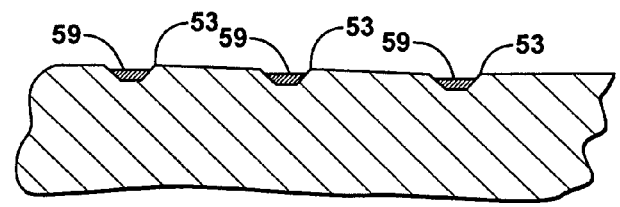
FIG. 2A is a partial cross-section of a refuse layer and a septage channel made in accordance of the present invention.
Figure 2B:
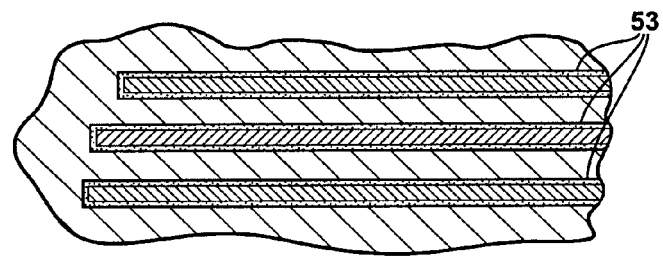
FIG. 2B is a plan view of FIG. 2A.

The second configuration of the septage distribution system 54 is shown in FIGS. 2A and 2B. In this embodiment, the septage distribution system 54 has a plurality of compaction channels or trenches 53 formed in the refuse layer 52 through the use of an excavator, a backhoe, or other such machine. Channels 53 can vary in dimensions, but a channel 53 having a depth of from about 26 inches to about 48 inches and a width of from about 18 inches to about 36 inches is preferred. It will be understood that the channels 53 serve to direct (controlled flow) the septage 59 across the refuse layer 52. As the septage 59 leaves hopper 58 and flows through delivery conduit 57, the septage 59 enters channels 53 where the septage 59 moves across the refuse layer 52 and simultaneously begins to flow downwardly into the refuse layer 52. In this particular configuration, the channels 53 become filled with the next deposit of a refuse layer when compacted.

In still another configuration of the septage distribution system 54, flexible hoses (not shown) similar to fire hoses, but with holes or perforations similar to holes 64 (described hereinafter) are rolled out on the surface of the refuse layer 52 to achieve substantially even distribution of the septage. After the septage is deposited, the hoses are reeled in, a second refuse layer is deposited and compacted, and the hoses are reeled out again to deposit septage on the second refuse layer. The common feature of these three configurations of septage distribution system 54 is that each provides controlled septage flow into a refuse layer from a plurality of predetermined high-concentration regions (i.e., pipes, channels or hoses) to substantially evenly distribute septage in a refuse layer.

Turning back to the embodiment of FIGS. 2-5, a few pipes 55 of the septage distribution system 54, which are shown in FIG. 4 of the drawings, have holes or openings 64 through which septage drains into the refuse layer 52. Preferably, the holes 64 face downwardly toward the refuse layer 52 (i.e. toward the floor 35). The spacing and relatives diameters of the holes 64 can take a number of combinations. For example, in one embodiment, a length of twenty feet of a pipe 55 may have holes 64 beginning near the manifold 56 and gradually increasing from about 6 inches to about 12 inches between each hole 64. As another example, the holes 64 may be from about ¼ inch to about ½ inch in diameter. (Note that the drawings in this application are not to scale). It is preferred that the arrangement of the holes 64 and spacing be such that the septage be distributed relatively uniformly over the refuse layer 52.

In one preferred embodiment, a processing unit (not shown) such as the "HONEY MONSTER" (JWC Environmental) can be used which processes septage for better flow through the hopper 58 and the septage distribution system 54. In one embodiment, the processing unit includes a flow meter which tracks the volume of septage flowing therethrough. The overall moisture content of the wet cell 50 may vary. Preferred moisture or liquid content ranges from about 25 percent by weight to about 70 percent by weight and more preferably from about 40 to about 70 percent by weight of the contents of the wet cell 50. Leachate collected in the drainage layer 46 and the gravel layer 44 is extracted through the leachate collection pipe 51 and may be recirculated through the refuse layer 52 by pumping leachate back to the hopper 58 alone or with the simultaneous addition of septage. Referring now to FIG. 5 of the drawings, a cell 50 is isolated from other cells by earthen bumps or intercellular berms 66. It will be understood that the level of leachate should be controlled so that the leachate does not leak into an adjacent dry cell in a mixed use (wet cells and dry cells) landfill.

In a preferred embodiment of the present invention, the septage distribution system 54 is also used to collect gasses, such as methane, generated by the decomposing of the refuse layer 52. Other conventional gas recovery apparatuses may also be used for this purpose. By activating a vacuum pump (not shown), the liquid distribution system 54 will collect the landfill gasses which can be run through a bypass (bypassing hopper) to a collection vessel (not shown). It may be preferable to first pressurize the distribution system 54 to blow out substantially all of the septage before the gas collection step. The methane may be used to power equipment at the site, may be sold as gas or may be used to operate an onsite generator for production and sale of electricity.

Figure 6:
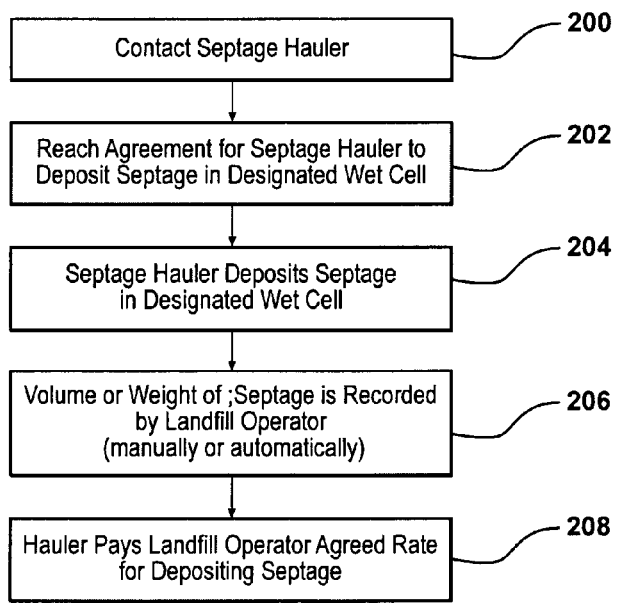
FIG. 6 is a block diagram flow chart illustrating an exemplary embodiment of the steps of the novel business method for operating a landfill in accordance with the present invention.

In still another aspect of the present invention, a method of doing business is provided. In one embodiment, the method includes the steps of entering into agreements with one or more septage hauler companies (or individuals) which require such septage haulers to deposit septage (preferably collected from the sources identified previously with respect to the landfill design and operation described above) in a designated landfill. Most preferably, the agreements with the septage haulers require that all of the haulers' septage be deposited in the designated landfill for a negotiated period of time. The designated landfill will have at least one section that is dedicated to wet cell decomposition through the addition of septage to the cell in the manner described in connection with the present invention as described above. In one embodiment, the amount charged to the septage hauler for depositing septage decreases as the volume of septage received from the septage hauler increase. In other words, in one embodiment, the agreement between the landfill operator and the septage hauler to the landfill during a predetermined period (for example, one year), the price that the hauler pays for depositing additional septage in the landfill is reduced. In another embodiment, (with or without an exclusive dealing agreement), septage haulers are encouraged to deposit septage at a designated landfill having a wet cell configuration or operation, as set forth in the broadest claims of this patent, by offering the haulers a monetary rebate if they offload a predetermined volume of septage within a specific period of time. Other such economic incentives may also be used. Thus, referring to FIG. 6 of the drawings, (by way of example only) in block 200 the landfill operator would contact a septage hauler. In block 202 the landfill operator and the septage hauler would reach an agreement whereby the septage hauler agrees to deposit all or at least a set minimum amount of septage at a designated landfill. The designated landfill will have a wet cell. The landfill or its operation is preferably covered by one or more claims of this patent or a patent which is a divisional of this patent. Next, as seen in block 204, the septage hauler deposits septage in the wet cell. In block 206, the volume or weight of septage deposited in the landfill by the hauler would be recorded (either manually or automatically), preferably by a flow meter (not shown) associated with hopper 58 or otherwise associated with landfill 34. In block 208, payment by the hauler would be made to the landfill operator.

Although certain preferred embodiments of the present invention have been described, the invention is not limited to the illustrations described and shown herein, which are deemed to be merely illustrative of the best modes of carrying out the invention. A person of ordinary skill in the art will realize that certain modifications and variations will come within the teachings of this invention and that such variations and modifications are within its spirit and the scope as defined by the claims.

What is claimed is:

1. A landfill containing refuse, said landfill comprising:
    at least one wet cell having at least one refuse layer;
    a septage distribution system in said wet cell above said refuse layer with said septage distribution system having defined spaces; and
    a quantity of septage temporarily occupying said defined spaces with said defined spaces being located about said refuse layer to provide controlled flow of said septage into said refuse layer.

2. The landfill recited in claim 1, wherein said septage distribution system is a plurality of distribution pipes.

3. The landfill recited in claim 2, wherein said plurality of pipes have a plurality of openings through which said septage flows into said refuse layer.

4. The landfill recited in claim 3, wherein said openings are substantially directed downwardly toward said refuse layer.

5. The landfill recited in claim 3, wherein said pipes are intermittently substantially filled with a landfill gas.

6. The landfill recited in claim 1, wherein said septage distribution system comprises a network of trenches formed in said refuse layer for receiving said septage.

7. The landfill recited in claim 1, wherein said septage distribution system comprises a plurality of hoses which are temporarily disposed on said refuse layer.

8. The landfill recited in claim 1, further comprising a leachate collection system in said wet cell for collecting leachate percolating through said refuse layer.

9. A method of decomposing refuse in a landfill having at least one wet cell, said method comprising the steps of:
    placing a layer of refuse at a bottom of the wet cell to define a refuse layer;
    placing a septage distribution system in association with the refuse layer; and
    adding septage to the refuse layer through the septage distribution system.

10. The method of decomposing refuse in a landfill recited in claim 9, wherein the step of placing the septage distribution system is further defined as placing a plurality of pipes is association with the refuse layer with each of the pipes having a plurality of holes therein and wherein the step of adding septage is further defined as adding septage to the refuse layer through the holes in the pipes.

11. The method of decomposing refuse in a landfill recited in claim 9, wherein the step of placing the septage distribution system is further defined as forming a plurality of trenches in the refuse layer and wherein the step of adding septage is further defined as adding septage to the refuse layer through the trenches.

12. The method of decomposing refuse in a landfill recited in claim 9, wherein the step of placing the septage distribution system is further defined as placing a plurality of perforated hoses in association with the refuse layer and wherein the step of adding septage is further defined as adding septage to the refuse layer through the perforated hoses.

13. The method of decomposing refuse in a landfill recited in claim 9 wherein the step of placing the septage distribution system is further defined as placing the septage distribution system on top of the refuse layer.

14. The method of decomposing refuse in a landfill recited in claim 13, wherein the step of placing a layer of refuse is further defined as placing a first refuse layer at a bottom of the wet cell and further comprising the steps of placing the septage distribution system on top of the first refuse layer and placing a second refuse layer on top of the septage distribution system and on top of the first refuse layer.

15. The method of decomposing refuse in a landfill recited in claim 14, wherein the step of placing the septage distribution system is further defined as placing a first septage distribution system on top of the first refuse layer and further comprising the step of placing a second septage distribution system on top of the second refuse layer.

16. The method of decomposing refuse in a landfill recited in claim 9, further including the step of collecting the gas generated by decomposing refuse.

17. The method of decomposing refuse in a landfill recited in claim 16 wherein the step of collecting the gas is further defined as collecting the gas through the septage distribution system.

18. The method of decomposing refuse in a landfill recited in claim 16, further including the step of drawing a vacuum through the septage distribution system to remove the gas.

19. The method of decomposing refuse in a landfill recited in claim 9, further including the step of collecting leachate and recirculating the leachate through the refuse layer.

* * * * *